United States Patent Office 3,248,452
Patented Apr. 26, 1966

3,248,452
ISOMERIZATION PROCESS USING OXYGENATED SULFUR-PHOSPHORIC ACID CATALYST
William G. Nixon, Westchester, Ill., assignor to Universal Oil Products Company, Des Plaines, Ill., a corporation of Delaware
No Drawing. Filed Jan. 24, 1964, Ser. No. 339,868
11 Claims. (Cl. 260—683.65)

This invention relates to a process for the conversion of isomerizable organic compounds and more particularly relates to a process for isomerizing isomerizable organic compounds into more useful compounds. More specifically, this invention is concerned with a process for the isomerization of an isomerizable hydrocarbon utilizing a novel catalytic composition of matter.

In recent years with the advances in the automotive industry, fuels of relatively high octane ratings have been found necessary. Many methods have been provided for the production of high anti-knock fuels. These methods include such processes as alkylation, catalytic reforming, catalytic cracking, and high temperature thermal cracking and reforming operations. Other processes which may be considered in one sense auxiliary were developed such as isomerization which was employed to produce isoparaffins which subsequently were reacted with olefins to form a high octane number motor fuel fraction, commonly termed alkylate. In addition to the production of one or more of the reactants by alkylation, isomerization was also utilized to increase the anti-knock quality of saturated hydrocarbons such as paraffins and naphthenes found in selected fractions of gasolines and naphthas. An example of the latter type of operation is a process in which pentane and/or hexane fractions are isomerized to produce isopentanes and/or isomeric hexanes, respectively, which subsequently may be employed as blending stocks for automotive and aviation fuels.

In most of the above-mentioned isomerization processes, catalytic agents are employed to effect the desired molecular rearrangement. Ordinarily, these catalytic agents consist of metal halides, such as aluminum chloride, aluminum bromide etc., which are activated by the addition of the corresponding hydrogen halide. These catalytic agents are very active and effect high conversion per pass of such compounds as normal butane. However, the activity of these catalysts is so high that the catalysts accelerate decomposition reactions as well as isomerization reactions with the result that the ultimate yield of isomerized product is reduced. This is particularly true as the molecular weight of the isomerizable compound increases through a homologous series, such as in going from normal butane to normal pentane and normal hexane to normal heptane. This cracking also considerably increases catalyst consumption by reaction of fragmental materials with the catalytic agent to form sludge-like material. In spite of what might have been predicted, these decomposition and/or cracking reactions cannot be reduced by simply lowering the reaction zone severity, for example, by reducing temperature or by increasing liquid hourly space velocity. At temperatures and space velocity which satisfactory isomerization reactions are obtained, these reactions are pronounced. I have discovered a catalytic agent which can be effectively employed in isomerization reactions in which, for example, the double bond of an olefinic hydrocarbon may be shifted to a more centralized position in the chain or the carbon skeleton arrangement of the compound may undergo rearrangement.

It is therefore an object of this invention to provide a process for the isomerization of isomerizable organic compounds utilizing a novel isomerization catalyst. A specific object of this invention is to provide a novel method and a novel catalyst for isomerizing isomerizable organic compounds to provide the desired isomerized product in high yields without the inducing of other decomposition reactions.

One embodiment of this invention resides in a process for the isomerization of an isomerizable organic compound at isomerization conditions in the presence of a substantially anhydrous catalyst prepared by combining a phosphoric acid-containing composite with an oxide of sulfur to effect chemical combination of the phosphoric acid portion of said composite with said oxide of sulfur.

A further embodiment of this invention resides in a process for the isomerization of an isomerizable hydrocarbon at isomerization conditions in the presence of a substantially anhydrous catalyst prepared by combining a phosphoric acid-containing composite with an oxide of sulfur selected from the group consisting of sulfuric acid, sulfurous acid, ammonium oxides of sulfur and metallic oxides of sulfur to effect chemical combination of the phosphoric acid portion of said composite with said oxide of sulfur.

A further embodiment of this invention resides in a process for the isomerization of an isomerizable hydrocarbon at isomerization conditions including a temperature in the range of from about —10° to about 300° C. and a pressure in the range of from about atmospheric to about 200 atmospheres in the presence of a substantially anhydrous catalyst prepared by combining a phosphoric acid-containing composite with an oxide of sulfur selected from the group consisting of sulfuric acid, sulfurous acid, ammonium oxides of sulfur and metallic oxides of sulfur to effect chemical combination of the phosphoric acid portion of said composite with said oxide of sulfur.

A specific embodiment of this invention resides in a process for the isomerization of normal butane at isomerization conditions including a temperature in the range of from about —10° to about 300° C. and a pressure in the range of from about atmospheric to about 200 atmospheres in the presence of a substantially anhydrous catalyst prepared by combining a phosphoric acid-containing composite with an oxide of sulfur selected from the group consisting of sulfuric acid, sulfurous acid, ammonium oxides of sulfur and metallic oxides of sulfur to effect chemical combination of the phosphoric acid portion of said composite with said oxide of sulfur.

Still another specific embodiment of the present invention resides in a process for the isomerization of normal hexane at isomerization conditions including a temperature in the range of from about —10° to about 300° C. and a pressure in the range of from about atmospheric to about 200 atmospheres in the presence of a substantially anhydrous catalyst prepared by combining a phosphoric acid-containing composite with an oxide of sulfur derived from ammonium sulfate to effect chemical combination of the phosphoric acid portion of said composite with said oxide of sulfur.

Other objects and embodiments referring to alternative isomerizable organic compounds and to alternative catalytic compositions of matter will be found in the following further detailed description of the invention.

The process of my invention is especially applicable to the isomerization of isomerizable saturated hydrocarbons including acyclic paraffins and cyclic naphthenes, and is particularly suitable for the isomerization of straight-chain and mildly branched-chain paraffins containing four or more carbon atoms per molecule, including normal butane, normal pentane, normal hexane, normal heptane, normal octane, etc., or cycloparaffins ordinarily containing at least five carbon atoms in the ring such as the alkylcyclopentanes and cyclohexanes including methylcyclopentane, dimethylcyclopentane, cyclohexane, methylcyclohexane, dimethylcyclohexanes, etc. It is also applicable to the conversion of mixtures of paraffins and/or naphthenes such as those derived by selective fractionation and distillation of straight-run or natural gasolines and naphthas. Such mixtures of paraffins and/or naphthenes include so-called pentane fractions, normal hexane fractions, and mixtures thereof. The process of my invention is also suitable for the isomerization of olefins, for example, the isomerization of 1-butene to 2-butene, etc., the isomerization of 3-methyl-1-butene to 2-methyl-2-butene, etc. The process may also be used for the isomerization of alkyl-aromatic hydrocarbons, for example, the isomerization of ethylbenzene to dimethylbenzene or xylene, the isomerization of propylbenzene to methyl ethyl benzene or trimethylbenzene etc. Suitable modifications and operating conditions may be necessary when the process is utilized for other than the isomerization of saturated hydrocarbons and therefore the various isomerization processes are not necessarily equivalent.

As set forth hereinabove, the process of my invention is especially applicable to the isomerization of saturated hydrocarbons such as normal butane, normal pentane, normal hexane, etc., and mixtures thereof. Furthermore, the saturated hydrocarbons are usually derived as selected fractions from various naturally occurring petroleum streams. For example, they may be separated as individual components or, as certain boiling range fractions by selective fractionation and distillation of straight-run or natural gasolines and naphthas. Thus, the process of this invention may be successfully applied to and utilized for complete conversion of isomerizable hydrocarbons when these isomerizable hydrocarbons are present in minor quantities in various gas streams. Thus, the isomerizable hydrocarbon for use in the process of this invention need not be concentrated. For example, isomerizable hydrocarbons appear in minor quantities in various refinery gas streams, usually diluted with gases such as hydrogen, nitrogen, methane, ethane, propane, etc. These refinery streams containing minor quantities of isomerizable hydrocarbons are obtained in petroleum refineries from various refinery installations including thermal cracking units, catalytic cracking units, thermal reforming units, coking units, polymerization units, dehydrogenation units, etc. Such refinery off-streams have in the past often been burned for fuel value, since an economical process for the utilization of the hydrocarbon content has not been available. This is particularly true for refinery gas streams known as off-gas streams containing relatively minor quantities of isomerizable hydrocarbons.

As hereinbefore set forth, the invention is concerned with a process for the isomerization of isomerizable organic compounds and more particularly for the isomerization of isomerizable hydrocarbons, said process being effected in the presence of a catalyst which possesses a high degree of hydrocarbon conversion activity and is particularly effective as an isomerization catalyst for isomerizable organic compounds, a representative number of which are hereinabove set forth. The catalyst comprises a phosphoric acid-containing composite that is combined with an oxide of sulfur to effect chemical combination of the phosphoric acid portion of said composite with said oxide of sulfur. The composite, if desired, may comprise a high surface area solid support although it is one of the features of the catalyst of the present invention that low surface area supports such as alpha-alumina are satisfactory for the preparation of catalysts for use in the process of this invention as contrasted to hydrocarbon conversion catalysts prepared by chemically combining only an oxide of sulfur with alpha-alumina, said alpha-alumina in the latter case being an unsatisfactory support for the oxide of sulfur alone.

As set forth hereinabove, the support may comprise a high surface area support. By the term high surface area is meant a surface area measured by surface adsorption techniques within the range of from about 25 to about 500 or more square meters per gram and preferably a support having a surface area of approximately 100 to 300 square meters per gram. However, as set forth hereinbefore, alpha-alumina, which is usually characterized by a surface area ranging from about 10 to about 25 square meters per gram is also a satisfactory support. Therefore, satisfactory supports for the preparation of catalysts for use in the process of this invention include high surface area crystalline alumina modifications such as gamma-, eta- and theta- alumina and low surface area supports such as alpha-alumina, although these are not necessarily of equivalent suitability. In addition to the aforementioned alpha-, gamma-, eta- and theta- aluminas which may be utilized as solid supports, it is also contemplated that other refractory oxides such as silica, zirconia, magnesia, thoria, etc. and combinations of refractory oxides such as silica-alumina, silica-magnesia, alumina-silica-magnesia, alumina-thoria, alumina-zirconia, etc. may also be utilized as solid supports for the catalyst of the present invention.

As set forth hereinabove, the catalyst comprises a phosphoric acid-containing composite that is combined with an oxide of sulfur to effect chemical combination of the phosphoric acid portion of said composite with said oxide of sulfur. The phosphoric acid-containing composite may be made by combining an acid of phosphorus such as ortho-, pyro-, or tetra-phosphoric acid with the solid support. Orthophosphoric ($H_3PO_4$) and pyrophosphoric acid ($H_4P_2O_7$) find general application due mainly to the cheapness and to the readiness with which they may be procured although the invention is not restricted to their use, but may employ any of the other acids of phosphorus insofar as they are adaptable. However, it is not intended to infer that the different acids of phosphorus which may be employed will produce catalysts which have identical effects upon any given organic reactions as each of the catalysts produced from different acids and by slightly varying procedures will exert its own characteristic action.

Triphosphoric acids, which may be represented by the formula $H_5P_3O_{10}$, may also be used as one of the starting materials for the preparation of the composite utilized in the catalyst of this invention.

A phosphoric acid mixture which is generally referred to as polyphosphoric acid may also be employed in manufacturing the composite. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79% to about 85% by weight of $P_2O_5$.

Tetraphosphoric acid, having the general formula $H_6P_4O_{13}$ which corresponds to the double oxide formula $3H_2O \cdot 2P_2O_5$ may be considered as the acid resulting when three molecules of water are lost by four molecules of orthophosphoric acid, $H_3PO_4$. The tetraphosphoric acid may be manufactured by gradual or controlled dehydration or heating of orthophosphoric acid and pyrophosphoric acid or by adding phosphorus pentoxide to these acids in proper amounts.

The phosphoric acid-containing composite utilized in the present invention may contain from about 8% or lower to about 80% by weight of phosphoric acid, and preferably from about 10% to about 50% by weight of phosphoric acid. Prior art solid phosphoric acid catalytic composites usually contain from about 50 to about 75% by weight of phosphoric acid composited with the solid carrier since lower acid contents cause the solid phosphoric acid catalytic composite to suffer from a hydrocarbon convention activity standpoint while those with too high a content of phosphoric acid have poor structural strength. Solid phosphoric acid catalytic composites have been manufactured by prior art methods with from about 15% to about 75% by weight of phosphoric acid but compression pressures ranging from about 5,000 to about 50,000 pounds per square inch during the manufacturing process have been found necessary to give the catalyst increased structural strength.

It is therefore a feature of the present invention that the phosphoric acid-containing composite utilized in the present invention may contain less than about 50% by weight of phosphoric acid without causing the hydrocarbon conversion activity of the finished catalyst to suffer and without the need for subjecting the composite to high compression pressures during manufacture in order to give the catalyst increased structural strength inasmuch as the finished catalyst of the present invention prepared as hereinafter set forth has increased structural strength and a high degree of stability due to the immobility of the components of the finished catalyst inasmuch as chemical combination of the phosphoric acid portion of the composite with the oxide of sulfur is accomplished as hereinafter described.

Oxides of sulfur which may be chemically bound to the phosphoric acid portion of the phosphoric acid-containing composite include metallic oxides of sulfur in which the metallic portion of the compound preferably comprises a metal of Group VI B of the Periodic Table, a metal of the Iron Group of Group VIII, as well as aluminum, etc. such as aluminum sulfate, nickel sulfate, nickel sulfite, chromium sulfate, chromium sulfate, molybdenum sulfate, tungsten sulfate, cobalt sulfate, cobaltous sulfite, ferric sulfate, ferric sulfite, etc. In addition to the hereinabove enumerated metallic oxides of sulfur it is also contemplated within the scope of this invention that the phosphoric acid-containing composite may be impregnated with a solution of ammonium sulfate or ammonium sulfite, or, if so desired, with a solution of sulfuric or sulfurous acid adjusted to a pH of about 9.0 by the addition of a sufficient amount of ammonium hydroxide. Following the impregnation, the phosphoric acid-containing support is then heat treated thereby driving off the ammonia and allowing the oxide of sulfur to remain impregnated on and chemically bonded to the phosphoric acid portion of the phosphoric acid-containing composite. The catalyst comprises an oxide of sulfur chemically combined with the phosphoric acid portion of the composite so as to effect chemical combination of the hydroxyl groups of the phosphoric acid with the oxide of sulfur, and as hereinbefore set forth, it is the particular association of these components which results in the unusual catalytic properties of this catalyst. In addition to the aforesaid oxides of sulfur, the phosphoric acid-containing composite may also be impregnated with concentrated sulfuric or sulfurous acid in an amount sufficient that the final catalytic composite possesses from about 1 to about 25% by weight of sulfate or sulfite content.

The chemical addition of the oxide of sulfur to the phosphoric acid portion of the phosphoric acid-containing composite will enhance the surface area characteristics of the composite inasmuch as the finished catalytic composite exhibits greater surface area than the phosphoric acid-containing composite originally possessed. Further, the final catalytic composite obtained by the preparation as described hereinabove is substantially anhydrous due to the chemical combination of the oxide of sulfur with the phosphoric acid-containing portion of the composite. Thus, it is another feature of the present invention that a substantially anhydrous support initially is not necessary to prepare the catalyst of the present invention. Still another feature of the present invention is that the final catalytic composite does not need hydration during processing as does a phosphoric acid-containing composite as is taught in the prior art inasmuch as the final catalytic composite is substantially anhydrous and thus deterioration of a physical nature by processing factors tending to further dry the catalyst is not a problem in the present invention.

As hereinbefore set forth, certain forms of alumina may be utilized as supports for the catalyst of this invention. For example, alumina may be prepared by any of the well known suitable means of manufacture, one example of which is the addition of an alkaline reagent to a salt of aluminum in an amount sufficient to form aluminum hydroxide, which, upon drying and calcining, is converted to alumina. Similarly, if the solid support comprises both alumina and silica, these components may be prepared by separate, successive or coprecipitate means.

For example, a phosphoric acid-containing composite previously prepared by the methods hereinbefore set forth is then chemically combined with an oxide of sulfur such as by treating the composite with an oxide of sulfur, said oxide of sulfur being added in an amount sufficient to allow the finished catalytic composite to contain from about 1.0 to about 25% or more by weight of sulfate or sulfite. Following this, the chemically combined material is then dried by heat treatment in a furnace tube or muffle furnace, etc. The finished catalytic composite comprising the oxide of sulfur chemically combined with the phosphoric acid portion of the phosphoric acid-containing composite is then utilized as the conversion catalyst.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the isomerizable organic compound is continuously charged to a reaction zone containing a fixed bed of the desired catalyst, said zone being maintained at the proper operating conditions of temperature and pressure including a temperature in the range of from about −10° to about 300° C., and preferably in the range of from about 0° C. to about 150° C., and a pressure in the range of from about atmospheric to about 200 atmospheres and at a liquid hourly space velocity (the volume of charge per volume of catalyst per hour) in the range of from about 0.1 to about 20 or more, and preferably in a range of from 0.1 to about 10, or at a gaseous hourly space velocity in the range of from about 100 to about 1500 or more. The reaction zone may comprise an unpacked vessel or coil or may be lined with an adsorbent packing material. The isomerizable organic compound passes through the catalyst bed in either an upward or downward flow and the isomerized product is continuously withdrawn, separated from the reactor effluent, and recovered, while any unreacted starting material may be recycled to form a portion of the feed stock. Another continuous type operation comprises the moving bed type in which the isomerizable organic compound and the catalyst bed move either concurrently or countercurrently to each other while passing through said reaction zone. Yet another continuous type of operation which may be used is the slurry type in which the catalyst in carried into the reaction zone as a slurry in the isomerizable organic compound.

Still another type of operation which may be used is the batch type operation in which a quantity of the isomerizable organic compound and the catalyst are placed in an appropriate apparatus such as, for example, a rotating or stirred autoclave. The apparatus is then heated to the desired temperature and maintained thereat for a predetermined residence time at the end of which time the vessel and contents thereof are cooled to room temperature and the desired reaction product recovered by conventional means such as for example, by washing, drying, fractional distillation, crystallization, etc.

The following examples are introduced for the purpose of illustration only with no intention of unduly limiting the generally broad scope of the present invention.

Example I

In this example, polyphosphoric acid is treated with ammonium hydroxide to a pH of approximately 9.0 and this solution is impregnated on the solid support, namely gamma-alumina. The impregnated support is then heated in a furnace tube to a temperature of about 500° C. and maintained at this temperature for a period of about two hours while heat treating the composite. During the heat treatment of the composite to the desired temperature, it will be noted that ammonia gas is evolved from the composite thereby leaving phosphoric acid deposited on the refractory oxide support. This phosphoric acid-containing composite containing approximately 50% by weight of phosphoric acid is then subjected to chemical reaction at a temperature in the range from about 300° C. to about 600° C. with an oxide of sulfur, namely sulfur trioxide. The finished catalyst will contain about 8.5 weight percent of sulfate (which is approximately 2.8 weight percent sulfur). This catalyst is designated as catalyst "A."

Example II

Another catalyst is prepared by impregnating silica with another poly-phosphoric acid-ammonia hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 30% by weight of phosphoric acid is then subjected to substantially complete chemical reaction with an oxide of sulfur derived from sulfuric acid. The composite is subjected to an impregnation with 85 cc. of a solution containing 10 cc. of concentrated sulfuric acid which has been adjusted to a pH of 9.0 with ammonium hydroxide. The resultant composite is again slowly heat treated in the furnace tube to about 600° C. and once again the evolution of ammonia gas takes place leaving the oxide of sulfur chemically combined with the phosphoric acid portion of the silica support. This catalyst is designated as catalyst "B."

Example III

Yet another catalyst is prepared by impregnating silica with another polyphosphoric acid-ammonium hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 25% by weight of phosphoric acid is then subjected to chemical reaction with an oxide of sulfur derived from aluminum sulfate. The composite is then subjected to an impregnation with 20% aluminum sulfate solution. The resultant composite is again slowly heat treated in the furnace tube to about 600° C. and chemical combination of the oxide of sulfur and the phosphoric acid portion of the silica support occurs. This catalyst is designated as catalyst "C."

Example IV

In this example, a catalyst is prepared by impregnating alumina with another polyphosphoric acid-aluminum hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 38% by weight of phosphoric acid is then subject to chemical reaction with an oxide of sulfur derived from ammonium sulfate. The composite is subjected to an impregnation with a 20% ammonium sulfate solution. The resultant composite is again slowly heat treated in the furnace tube to about 600° C. and once again the evolution of ammonia gas takes place leaving the oxide of sulfur chemically combined with the phosphoric acid portion of the alumina support. This catalyst is designated as catalyst "D."

Example V

The catalyst prepared according to Example I above and designated as catalyst "A" is utilized in an isomerization reaction zone to determine the isomerization activity of said catalyst. In this experiment, 100 grams of the catalyst prepared according to the method of Example I is placed in the reaction zone which is provided with heating means. In the experiment, normal butane is charged to the isomerization reaction zone. The reaction zone is maintained at about 750 p.s.i.g. and about 140° C. Substantial conversion of the normal butane to isobutane is obtained as is evidenced by gas-liquid chromatography.

Example VI

The catalyst prepared according to Example II and designated as catalyst "B" is utilized in an isomerization reaction zone, 100 grams of the finished catalyst being placed in the isomerization apparatus. In the experiment, normal pentane is charged to the isomerization zone which is maintained at about 1000 p.s.i.g. and 110° C. Substantial conversion of the normal pentane to isopentane is obtained as is evidenced by gas-liquid chromatography.

Example VII

The catalyst prepared according to Example III and designated as catalyst "C" is utilized in an isomerization reaction, 100 grams of the finished catalyst being placed in the isomerization apparatus. In the experiment, normal butane is charged to the isomerization zone. The reactor is maintained at about 1000 p.s.i.g. and about 130° C. Substantial conversion of the normal butane to isobutane is obtained as is evidenced by gas-liquid chromatography.

Example VIII

The catalyst prepared according to Example IV above and designated as catalyst "D" is utilized in the isomerization reaction zone to determine the isomerization activity of said catalyst. In this experiment, 100 grams of the catalyst is placed in the appropriate apparatus which is provided with heating means. In the experiment, normal hexane is charged to the isomerization reactor which is maintained at about 1200 p.s.i.g. and about 130° C. Substantial conversion of the normal hexane to 2,2-dimethylbutane, 2,3-dimethylbutane, 2-methylpentane and 3-methylpentane is obtained as is evidenced by gas-liquid chromatography.

I claim as my invention:

1. A process for the conversion of an isomerizable paraffinic hydrocarbon of from 4 to about 8 carbon atoms per molecule, which comprises isomerizing said hydrocarbon at a temperature in the range of from about −10° to about 300° C. and a pressure in the range of from about atmospheric to about 200 atmospheres in contact with a substantially anhydrous catalyst prepared by chemically combining the phosphoric acid portion of a phosphoric acid-containing composite with a compound containing oxygen and sulfur selected from the group consisting of sulfuric acid, sulfurous acid, and sulfates and sulfites of ammonium, aluminum and metals of Groups VI–B and VIII of the Periodic Table.

2. The process of claim 1 further characterized in that said isomerizable hydrocarbon is an acyclic Paraffin.

3. The process of claim 1 further characterized in that said compound containing oxygen and sulfur is sulfuric acid.

4. The process of claim 3 further characterized in that said isomerizable hydrocarbon is normal pentane.

5. The process of claim 1 further characterized in that said compound containing oxygen and sulfur is ammonium sulfate.

6. The process of claim 5 further characterized in that said isomerizable hydrocarbon is normal hexane.

7. The process of claim 1 further characterized in that said compound containing oxygen and sulfur is aluminum sulfate.

8. The process of claim 7 further characterized in that said isomerizable hydrocarbon is normal butane.

9. The process of claim 1 further characterized in that said isomerizable hydrocarbon is normal butane.

10. The process of claim 1 further characterized in that said isomerizable hydrocarbon is normal pentane.

11. The process of claim 1 further characterized in that said isomerizable hydrocarbon is normal hexane.

References Cited by the Examiner

UNITED STATES PATENTS

| | | | |
|---|---|---|---|
| 2,148,378 | 2/1939 | Malishev | 252—437 X |
| 2,148,634 | 2/1939 | Malishev | 252—437 X |
| 2,575,457 | 11/1951 | Mavity | 260—683.65 X |
| 2,843,640 | 7/1958 | Langlois et al. | 252—437 X |
| 2,939,896 | 6/1960 | Myers | 260—683.68 |
| 2,967,156 | 1/1961 | Talvenheimo | 252—437 |
| 3,115,532 | 12/1963 | Schwartz | 260—683.65 |
| 3,177,151 | 4/1965 | Calvert | 252—437 X |

DELBERT E. GANTZ, *Primary Examiner.*

R. H. SHUBERT, *Assistant Examiner.*